June 25, 1929.   C. A. B. HALVORSON, JR   1,718,927
SEARCHLIGHT
Filed June 26, 1920   4 Sheets-Sheet 1

Inventor,
Cromwell A.B. Halvorson, Jr,
by Albert G. Davis
His Attorney.

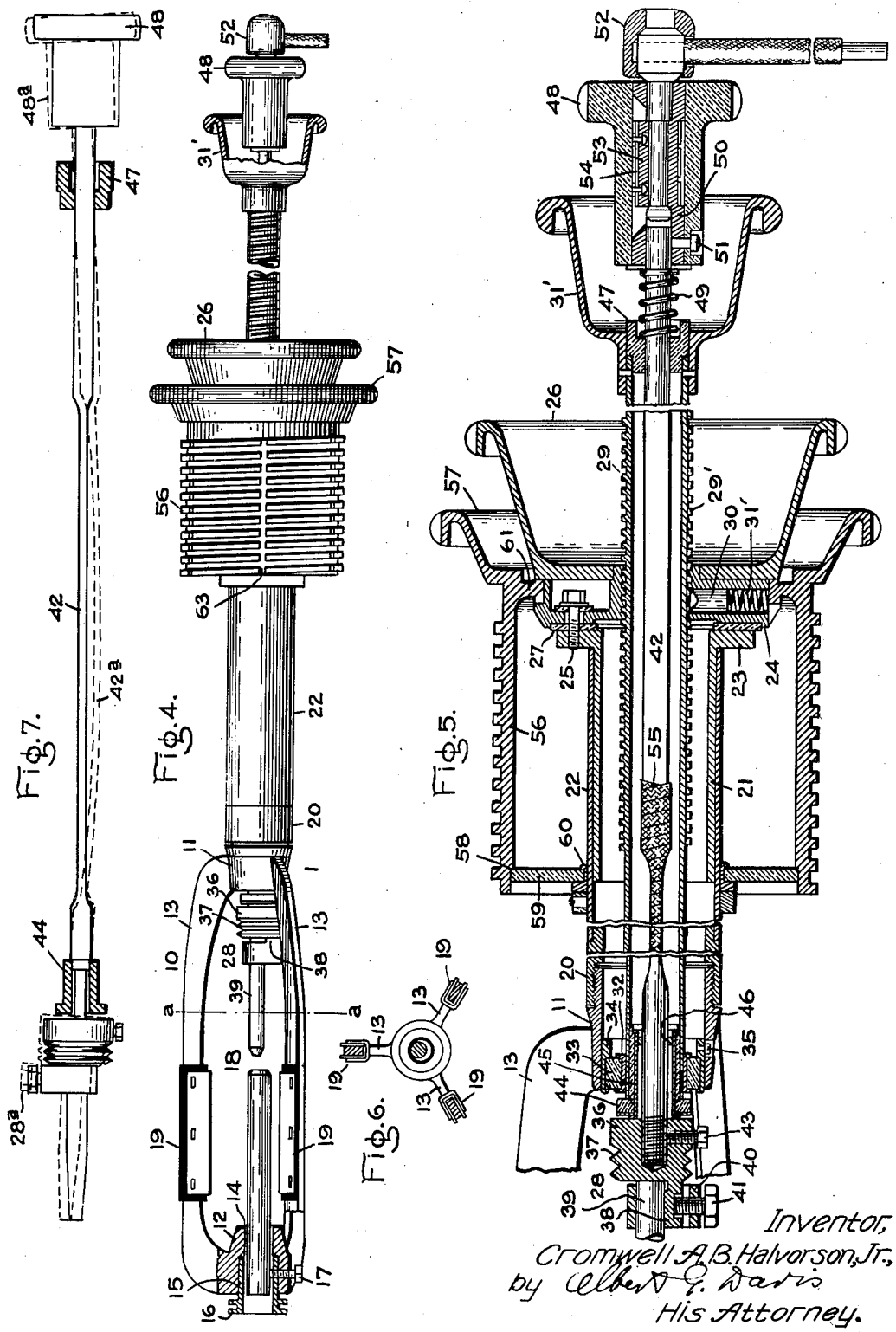

June 25, 1929.　　C. A. B. HALVORSON, JR　　1,718,927
SEARCHLIGHT
Filed June 26, 1920　　4 Sheets-Sheet 3
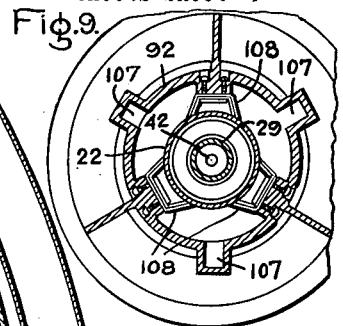
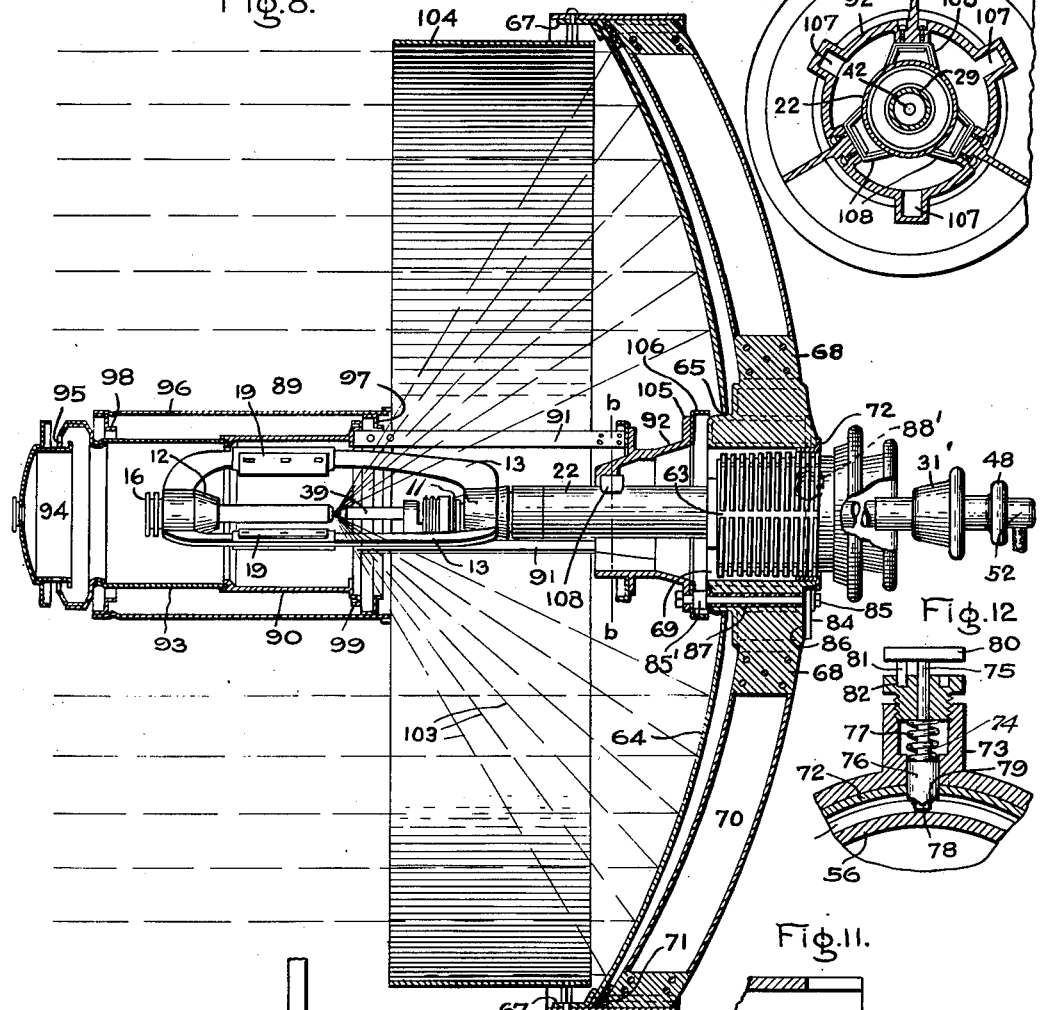
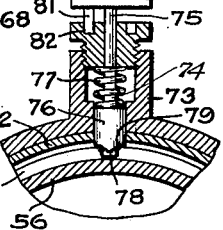
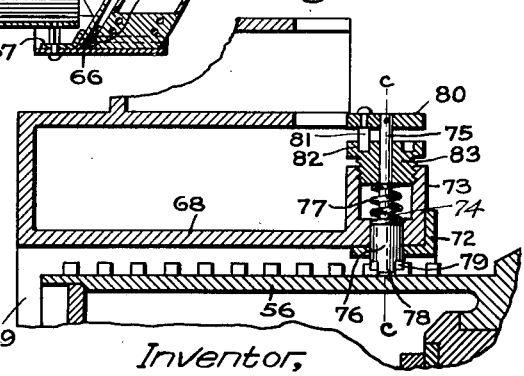
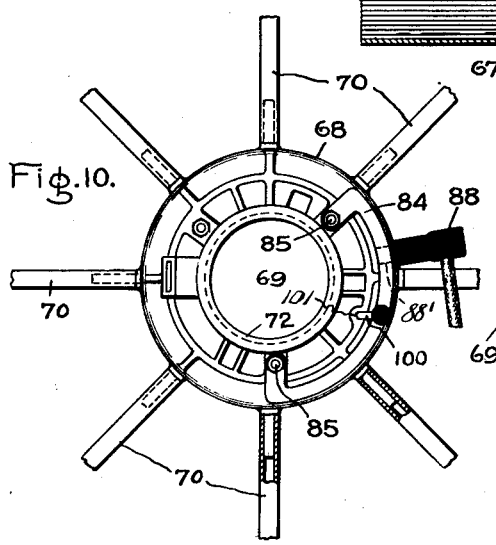
Inventor,
Cromwell A. B. Halvorson, Jr.,
by Albert G. Davis
His Attorney.

June 25, 1929.  C. A. B. HALVORSON, JR  1,718,927
SEARCHLIGHT
Filed June 26, 1920   4 Sheets-Sheet 4
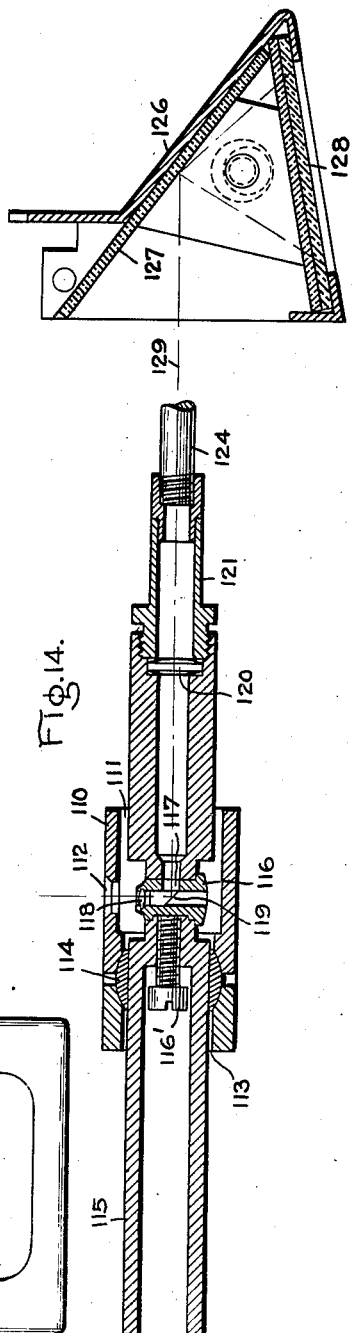
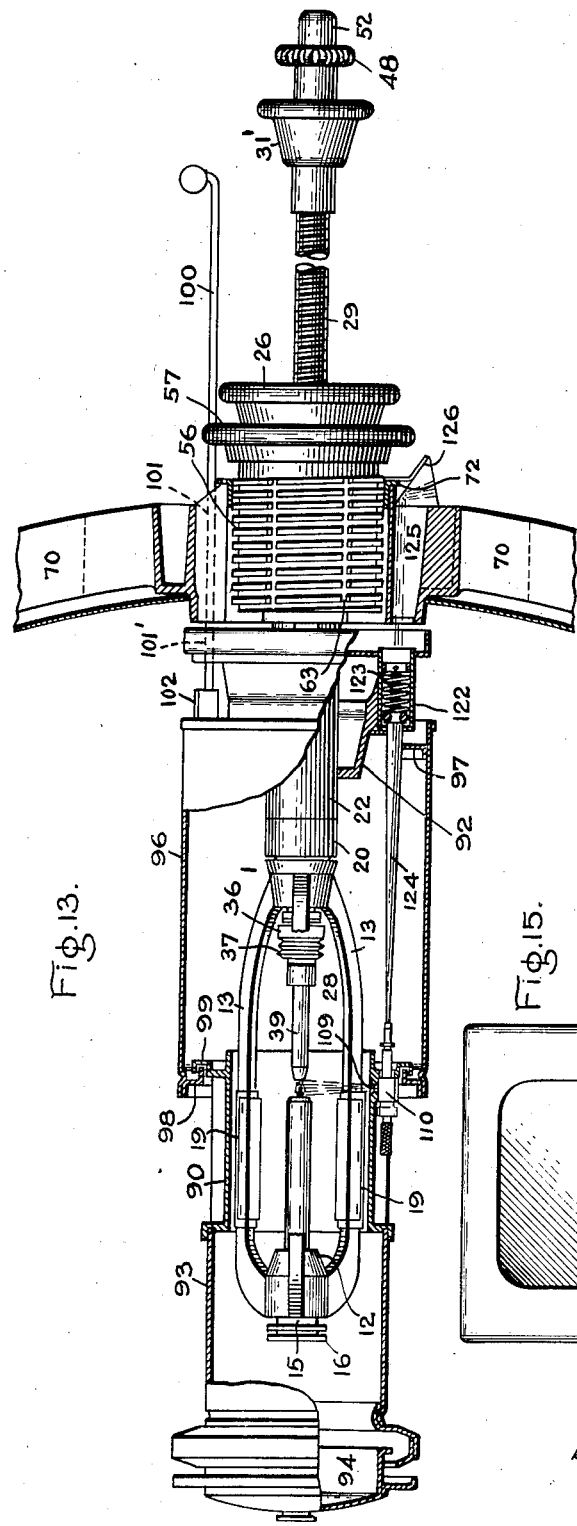
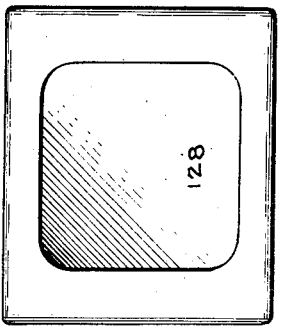
Inventor,
Cromwell A. B. Halvorson, Jr.,
by Albert G. Davis
His Attorney Patented June 25, 1929.

1,718,927

UNITED STATES PATENT OFFICE.

CROMWELL A. B. HALVORSON, JR., OF LYNN, MASSACHUSETTS, ASSIGNOR TO GENERAL ELECTRIC COMPANY, A CORPORATION OF NEW YORK.

SEARCHLIGHT.

Application filed June 26, 1920. Serial No. 391,991.

My invention has reference to improvements in searchlights and has for its object the provision of a simple, rugged and efficient device of this character.

More specifically, my invention relates to open type searchlights, and while it may be used successfully under all conditions, it is particularly adapted for service which requires a rigid compact unit capable of hard or rough usage and of light weight to enable its rapid removal from one point to another, such as field service under war conditions. Heretofore great difficulty has been experienced in using searchlights under such conditions, particularly the large searchlights, due to their great weight and complicated mechanism. For example, a 60 inch searchlight, which type was largely used, weighed approximately 6600 lbs. and was very immobile and unsuitable for the rough usage in the field to which it was subjected. Such searchlights were usually of the closed barrel type. Heretofore the operating mechanism has been too delicate for field conditions and too complicated, skill of high order being required to maintain it in operative condition.

In order to overcome these difficulties I provide an open type searchlight in which the reflector has a central opening fitted with a support and a lamp unit arranged to be inserted into the support from the rear of the reflector and supported thereby in the axis of the reflector. My lamp unit is manually operated and consists of a number of members concentrically arranged about a common axis. The weight of a complete 60 inch searchlight embodying my invention may be as low as 300 lbs. A novel feature of my invention is that the unit may be operated entirely from a position in the rear of the reflector. Novel means are provided for striking the arc, trimming uneven lips on the positive crater and for focusing the source of light. I have also provided novel occulting and arc shielding means and means for viewing the arc when the occulter is either in an open or closed position, which means are both operated from the rear of the reflector.

While I have illustrated a searchlight embodying my invention as mounted on a carriage, it is to be understood that it may be mounted otherwise. It is also to be understood that my invention is not limited to 60 inch searchlights.

Other objects and purposes of my invention will appear in the course of the following specification in which I have shown my invention embodied in concrete form for purposes of illustration.

In the accompanying drawing Fig. 1 is a perspective view of a searchlight embodying my invention mounted on a carriage.

Fig. 4 is a side elevation of my lamp unit.

Fig. 5 is an enlarged vertical section of the upper portion of the lamp unit shown in Fig. 4 showing the operating mechanism.

Fig. 6 is a section taken on the line $a$—$a$ of Fig. 4.

Fig. 7 is a side elevation of a part of the negative electrode mechanism, showing in dotted lines one of the positions it may assume in operation.

Fig. 8 is a vertical section of a reflector and baffle embodying my invention showing my lamp unit and occulter in operative position partly in elevation and in section.

Fig. 9 is a section taken on the line $b$—$b$ of Fig. 8.

Fig. 10 is a partial front elevation of the reflector support showing the positive electrode connections and arc finder.

Fig. 11 is an enlarged detail view of a part of Fig. 8.

Fig. 12 is a section taken on the line $c$—$c$ of Fig. 11.

Fig. 13 is a view in elevation and in section illustrating the occulting and arc viewing devices.

Fig. 14 is an enlarged detail view of the arc viewing device.

Fig. 15 is a front elevation of the arc viewing window.

Figure 1:
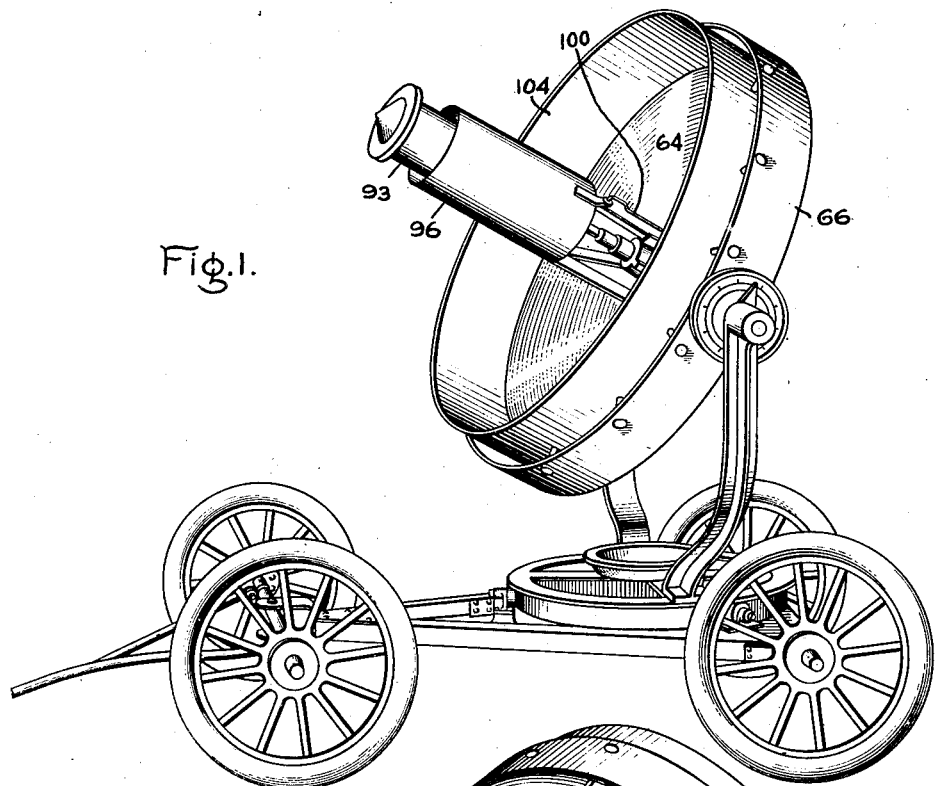

The lamp unit is in the form of an elongated structure with its various parts concentric about a common axis, as shown in Fig. 4. At one end the lamp unit is provided with a positive electrode holder, indicated by the numeral 10. This holder is preferably formed of one casting of conducting material, and is provided at one end with a tubular member 11, externally threaded as shown in Fig. 5, and at its opposite end with a nozzle 12 (Fig. 4). The member 11 and nozzle 12 are united by a suitable number of arms 13, preferably three, symmetrically arranged with the nozzle directed inwardly as shown in Fig. 4.

The nozzle 12 has the usual central passage 14, which passage has been slightly reamed from the rear end of the nozzle. A sleeve or bushing 15, of conducting material, is arranged to fit into the reamed portion of the passage 14 so as to make electrical contact with the nozzle 12. This bushing 15 is provided with a knob 16 at its outer end to afford a means whereby it may be readily inserted or removed from the nozzle and to radiate heat readily. The positive electrode is securely held in the sleeve 15 by a number of set screws 17, one of which is shown in Fig. 4.

From the drawings, it will be seen that the arms 13 support the nozzle 12 directed inwardly and form a basket inclosing the arcing region 18. In order to protect the arms 13 from injury from the arc, I have provided protective shields 19 on each of said arms opposite the arcing region. These shields are made of suitable heat protecting material and are insulated from the arms.

The electrode holder 10 is supported by a tubular casting 20, of conducting material, which is internally threaded at one end and into which the member 11 is screwed. At its opposite end, the casting 20 is rigidly secured to a casting 21 by means of a steel tube 22, as shown in Fig. 5. The casting 21 is provided with a flange 23 and is secured to a cylindrical casting 24 in any suitable manner, such as by bolts 25, one of which is shown in Fig. 5. The casting 24 supports a cup-shaped hand wheel 26. It will be observed that the flange 23 is separated from the casting 24 by an insulating washer 27, which insulates the parts forming the positive circuit from the remainder of the lamp as will appear hereinafter. As shown in the drawings, the tubular member 20, which supports the positive electrode holder 10, is arranged to support the nozzle 12 in the axis of the lamp. The electric circuit to the positive electrode in the lamp unit is through the tube 22, casting 20, and member 11, arms 13, and the nozzle 12. While I have shown three arms 13, it is to be understood that any suitable number could be used when arranged symmetrically, the object being to provide a balanced current and thereby set up an equal magnetic field in each arm, so that the magnetic fields of the several arms will counteract each other and thereby prevent the arc from blowing, in a manner readily understood. I have thus far described those parts of the lamp relating to the positive electrode.

A negative electrode holder indicated by the numeral 28 is supported within the area inclosed by the arms 13, in a tubular member 29 in a manner fully described hereinafter. This member 29 is located in the axis of the lamp unit and passes through the members 11 and 20 of the positive electrode mechanism. The member 29 is externally screw threaded as shown in Fig. 5 and passes through an internally threaded opening in the element 24 in which the hand wheel 26 is mounted. The externally threaded portion of the member 29 is provided with a number of longitudinal grooves 29', preferably three, one of which is shown in Fig. 5, which are engaged by a detent 30 normally urged to engage the grooves by a spring 31'. The purpose of this detent is to prevent the too free rotation of the member 29, as will later appear. At its end opposite the negative head, this member 29 has a cup-shaped hand wheel 31', rigidly secured to it in any suitable manner. At one end the tube 29 is supported in the axis of the lamp by a metal ring 32, the opening of which is sufficiently large to permit the tube 29 to move in either direction on said axis. The ring 32 supports an insulating ring 33, which is securely fitted into a metal sleeve 34. The latter sleeve is fitted into the member 11 and suitably secured therein such as by a screw 35. At its opposite end the tube 29 is supported in the opening of the hand wheel 26. It will, therefore, be seen that the negative electrode holder 28 may be moved axially in either direction with respect to the positive electrode head 12 by rotating the hand wheel 31'. The axial movement of the member 29 is to compensate for the consumption of the negative and positive electrodes.

The negative head 28 is formed of a cylindrical casting 36 of conducting material which has a few large threads 37 nearest the nose end of the head to form radiating ribs. The casting 36 is formed with a projection 38 eccentrically located with respect to the axis of the lamp, which serves as a means for holding the negative electrode 39 in position.

The negative electrode is placed on the projection 38 and secured by a ring 40, which is slipped over the electrode and the projection 38 and tightened by a set screw 41 in a manner readily understood.

A flexible rod 42, of conducting material, is located in the axis of the lamp unit within the tube 29 and projects from the ends thereof. At one end this rod 42 is rigidly secured to the negative electrode holder 28 in conductive relation therewith in any suitable manner, such as by providing the casting 36 with an opening into which the rod 42 is inserted and securing it therein by a set screw 43 as shown in Fig. 5. It will be seen that a tubular member 44 of insulating material having a collar at one end fits into the end of tube 29, the collar separating the electrode head 28 from the adjacent parts supporting the tube 29 in the axis of the lamp. A metal sleeve 45 is fitted into the insulated member 44 to protect it from wear. A metal ring 46 is fitted into the tube 45 near its end adjacent the negative electrode holder, the opening of which ring is large enough to permit the rod 42 to move in either direction in the axis of the lamp. The purpose of this ring will fully appear subsequently herein. At its opposite end, the rod is supported by an insulating member 47 fitted into the tube 29 and the cup shaped handwheel 31'. The handwheels are all cup shaped in order that they may have a greater latitude of movement within each other and thus form a more compact unit. The member 47 has a central opening in the axis of the lamp, through which the rod 42 passes. This opening is large enough to permit the rod to move axially in either direction. At its end opposite the end engaging the negative electrode holder 28, the rod 42 is provided with a handle 48. A spring 49 is interposed between the insulating member 47 and the handle 48. The negative electrode holder may therefore be moved towards the positive nozzle by compressing the spring 49 with the handle 48. On releasing the handle 48, the spring 49 restores the negative electrode holder to its former normal position with respect to tube 29, in a manner readily understood. This axial movement of the rod 42 is provided for striking the arc.

The handle 48 may be provided with any standard type of socket in electrical contact with the rod 42. In the drawings, I have shown the handle as made of insulating material, which may be wood or hard rubber, and as having an inner copper contact sleeve 50 to which the rod 42 is rigidly secured in any suitable way, such as by a set screw 51 and in conductive relation therewith. The opposite end of the sleeve 50 is arranged to receive a plug 52, connected to the negative side of the line, which plug is held in position by a member 53 pressed radially by a leaf spring 54. It will therefore be seen that the negative circuit in the lamp is from the plug 52, through the handle 48, rod 42 and casting 36.

It will be observed that the handle 31' is also cup shaped so as to permit the handle 48 to be bent laterally, the rod 42 being flexible, as above pointed out. When the handle 48 is thus laterally displaced, the member 47 and the ring 46 act as fulcrums for the rod. Therefore, when the handle 48 is moved to the position 48ª indicated by dotted lines in Fig. 7, the rod 42 is bent in the position 42ª indicated by dotted lines and the negative electrode head 28 assumes the position 28ª indicated by dotted lines. This movement increasing the eccentricity of the negative electrode is provided to correct uneven protruding lips on the positive crater which is accomplished by flexing the rod 42 in the manner indicated and rotating the handle 48. The portion of the rod 42 within the tube 29 is wrapped with a suitable insulating tape 55 to insulate it from the tube when bent in the manner indicated.

The parts thus far described are supported in a cylindrical casting 56, formed with a hand wheel 57 at one end concentric with the hand wheel 26 as shown in Fig. 5. The casting 56 is reamed at its end opposite the hand wheel 57 forming a shoulder 58, arranged to receive an insulating ring or disc 59, which supports the casting at this end concentric with the axis of the lamp unit. A metal ring 60 is provided in the ring 59 to serve as a bearing for the elements rotated by the hand wheel 26. At its opposite end, near the hand wheel 57, the casting 56 is provided with an internal flange 61 arranged to engage in a groove in the casting 24 to which the hand wheel 26 is secured. The flange 61 serves as a bearing for the casting 56 at this end. It will thus be seen that the positive and negative electrode holders may be rotated by the hand wheel 26, within the casting 56 without altering their relative position to each other or to the casting 56, the tube 29 being held in a fixed relation to the hand wheel 26 by the detent 30. If, however, it is desired to rotate the positive holder without moving the negative holder, this may be done by holding the hand wheel 31' and rotating the hand wheel 26. On its outer surface, the casting 56 is threaded as shown, which threads serve as a means for focusing the lamp unit in the searchlight, as will later appear. These threads are also cut axially by a number of slots 63 which serve to prevent the lamp unit from rotating when other members are rotated, as will also be described hereinafter. The parts thus far described constitute the complete lamp unit proper.

A reflector 64 (Fig. 8) having a central opening 65 is suitably supported on its front side in a metal cylinder 66, preferably of thin steel by a number of clamps 67 riveted to the cylinder. A casting 68, with a central opening 69 arranged to support the lamp unit, fits into the central opening 65 of the reflector, slightly projecting therethrough, and is supported by a number of ribs 70 (see Fig. 2). These ribs are preferably formed of steel tubes, and are riveted to the casting 68 at one of their ends, and at their opposite ends to the cylinder 66. The reflector is supported in the back by these ribs adjacent the cylinder 66, felt or other suitable cushioning material 71 being interposed between the ribs and the back of the reflector to protect the mirror from the inequalities of the clamping surfaces. A flanged lining 72 (Fig. 11) is provided in the opening 69 on which the lamp unit 1 bears when inserted in the breach of casting 68.

The casting 68 is provided with a small casing 73 in which is mounted a detent 74 formed with a stem 75 and a plunger 76, the plunger being normally urged into the central opening 69 by a spring 77, as shown in Figs. 11 and 12. The plunger 76 is provided with a projection 78 arranged to engage the threads in the casting 56, when the lamp unit is inserted in the supporting casting 68. The plunger 76 is also provided with a V-shaped projection 79 at right angles to the projection 78, to engage the slots 63 on the lamp unit and thus hold the lamp unit in a fixed or steady position. The detent 74 may be withdrawn from the central opening 69, in order that the lamp unit may be inserted therein, by a handle 80 (see Fig. 12) secured to the stem 75. This handle has a small inwardly projecting pin 81, arranged to fit into an opening 82 on the top 83 of the casing 73. When the pin 81 is in the opening 82, the spring 77 is free to urge the plunger 76 into the central opening 69, or the plunger may be held in a withdrawn position, free of the central opening 69, by moving the pin 81 from the opening 82 and rotating the handle 80 to bring the pin 81 into engagement with the top surface of the member 83, in a manner readily understood. A bus bar 84, shown in Fig. 10, is secured to the casting 68 by two pins 85, and suitably insulated from said casting by an insulating member 86, Fig. 8. The pins 85, which are in electrical contact with the bus bar, form a part of the positive circuit. They are surrounded by insulating sleeves 87 and extend through the casting 68, as shown in Fig. 8. A suitable switch plug 88, connected to the positive side of the line, is arranged to be inserted in a socket 88', shown in Fig. 10 and indicated by dotted lines in Fig. 8, to make electrical contact with the bus bar 84.

Figure 3:
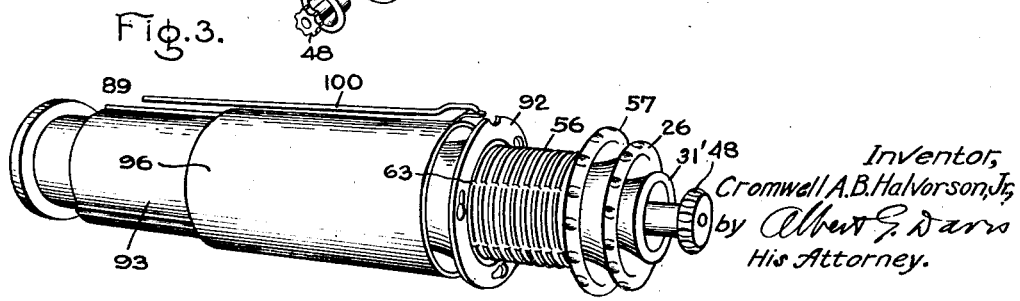
Fig. 3 is a perspective view of my lamp unit with an occulter in a closed position.

An occulter Figs. 3 and 13, indicated by the numeral 89, is provided to shield the arc from disturbing elements and to darken the lamp. This occulter is formed with a cylindrical member 90, which is supported in the axis of the lamp in a position to inclose the arcing region of the lamp by a suitable number of arms 91, one of which is shown in Fig. 8. In this position, however, no direct rays of light from the arc that strike the reflector are intercepted. The arms 91 are suitably secured to and insulated from a cylindrical casting 92, which forms the supporting base for the occulter and forms a part of the positive circuit, as will later appear. The member 90 is flanged at its end opposite the supporting arms 91 and supports in said flange a tubular member 93, the members 90 and 93 forming a chimney for the lamp unit. The member 93 is provided at its extreme end with a light intercepting ventilator, indicated by the numeral 94. From Fig. 8 it will be seen that products of combustion may escape from within the cylinder 90, through the passage 95, and that the walls of the member 93 are so arranged as to prevent the passage of rays of light, as will be readily understood.

An open ended cylindrical member 96, of larger diameter than the members 90 and 93, and concentrically mounted with respect to them, forms a sliding shutter for the occulter arranged to intercept the light rays passing from the arcing region 18 to the reflector 64. In the open position of the occulter permitting the uninterrupted passage of light to the reflector, the cylinder 96 telescopes the members 90 and 93, and in the closed position the cylinder 96 telescopes the arms 91. At one end the cylinder 96 has an internal flanged ring 97, Fig. 8, arranged to slide over the arms 91 and guide the cylinder. At its opposite end the cylinder 96 has an internal flanged ring 98 arranged to engage an annular flange 99 formed on the member 90 when the occulter is in closed position, as shown in Fig. 13. The shutter member 96 of the occulter is operated from the rear of the reflector by a handle 100. This handle passes through an opening 101, shown in Fig. 10 and indicated in dotted lines in Fig. 13, in the casting 68 and through an opening in the base support 101' coinciding therewith and is suitably secured to the shutter at 102. As hereinbefore stated, the cylindrical member 90, which forms a chamber shielding the arcing region, permits the free passage of direct rays of light that strike the reflector, as indicated by broken lines 103 in Fig. 8. The rays not striking the reflector, strike the inner walls of the members 90 and 93 and a portion of the inner wall of the shutter 96. These latter obstructed rays of light are reflected by these walls, and in accordance with well known laws of physics, pass into a field outside of the reflector. As it is desirable to confine the rays to the reflector, keeping the surrounding field in darkness, I have provided a baffle 104, to intercept these reflected rays, which baffle is in the form of a cylinder of a suitable width concentric with the lamp unit and suitably secured to the cylinder 66. As I have above stated, the occulter supporting member 92 is of conducting material and forms a part of the positive circuit. This member is provided with a flange 105 which bears upon a cylindrical member 106 when the lamp is mounted in the reflector, the purpose of which will later appear. The member 92 is provided with three grooves 107, shown in Fig. 9, which grooves are arranged to fit over the arms 13, and thus permits the lamp unit to be fitted into the occulter. A suitable number of electrical brushes 108, which I have shown as three in number, are suitably provided on the member 92 arranged to make contact with the tube 22 when the lamp unit is inserted in the casting 68. From the foregoing it will be seen that the positive circuit is from the plug 88, Fig. 10, through the bus bar 84, pins 85, Fig. 8, casting 92, brushes 108, to the tube 22 and through the lamp unit as previously described.

In order that the arc may be viewed by the attendant operating the searchlight from the rear of the reflector, I employ a system of lenses and reflectors, which project the image of the arc through an opening in the casting 68. The member 90, forming the arc shielding chamber, is provided with an opening 109 properly located so that the arc may be viewed through it from the side of the lamp unit. Adjacent this opening there is suitably mounted on the flange 99 of the member 90, a cylindrical casing 110, having at one end a central passage 111. An opening 112 in the side of the casing 110 connects with the passage 111 and is located to coincide with the opening 109, when the casing 110 is mounted as described. At its opposite end, the casing 112 is also provided with a central passage 113, somewhat smaller than the passage 111, having a ball and socket indicated by the numeral 114. A tubular member 115, extending through the passages 113 and 111, passes through said ball and is supported thereby as shown in Fig. 14. The portion of the tube 115 within the passage 111 and opposite the opening is somewhat reduced in size. A tubular member 116 is set at right angles to the axis of the member 115 in this reduced portion, being held in position by a screw 116', the central passage of the member 116 being connected with the central passage within the member 115 by an opening 117. A small objective lens 118 is suitably mounted in the member 116 at its end opposite the opening 112 and a reflector 119 is suitably mounted in the passage within the member 116 at an angle of 45 degrees to said passage and the passage within the member 115. A magnifying lens 120 is suitably mounted within the casing to receive the reflected image from the reflector 119. A threaded sleeve 121 is fitted to the member 111 adjacent the lens 120. The occulter base 92 is formed with a small casing 122, having a central passage open at both ends into which is fitted a helical spring 123. A tubular member 124, within the area embraced by the shutter 96, is slidably fitted into the sleeve 121 at one end, and at its opposite end fits in the casing 122 and is normally urged into the sleeve 121 by the spring 123. The purpose of this arrangement is to afford a ready means for removing the tube 124 from the lamp unit which is done by compressing the spring 123 and sliding it from the sleeve 121. The casting 68 is provided with an opening 125 coinciding with the opening in the casing 122 and at its end in the rear of the searchlight is provided with a housing 126 suitably mounted on the casting 68 in which a reflector 127 is supported at an angle of 45 degrees to the axis of the member 115. A suitable window 128, preferably of ground glass, is provided in the housing 126 for viewing images in the reflector 127. From the foregoing it will be seen that the image of the arc passes through the openings 109 and 112, the lens 118 to the reflector 119, where it is reflected into the passage within the member 115 to the lens 120. Thence it passes through the sleeve 121, the tube 124, casing 122, and opening 125 to the reflector 127, from which it may be viewed through window 128 as indicated by the broken line 129. In order that the arc viewing system may be initially adjusted, the ball and socket 114 have been provided, the adjustment being accomplished by moving the member 115 laterally until the lens 119 is in proper position with respect to the arc.

Having described the construction of a searchlight embodying my invention, the operation thereof will be readily understood. Preferably the occulter is first secured to the casting 68 by means of the pins 85, the flanged member 106 being interposed between the base 92 of the occulter and said casting 68. As shown in the drawings, the member 106 is held in a suspended position by the collars 85' on the pins 85 with an opening between it and casting 68. The flanged member 106 prevents the passage of light from the arc through the central opening 69 and the opening between it and the casting 68 serves as a flue for the occulter chimney to give the necessary draft to carry off the products of combustion when the shutter 96 is in a closed position. It is, of course, understood that the pins 85 which secure the occulter to the supporting casting 68, also serve as the positive conductors between the bus bar 84 and the base 92, which is provided with brushes 108, as previously described.

Figure 2:
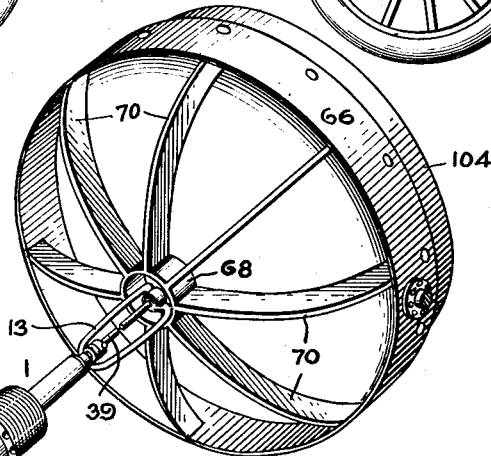
Fig. 2 is a perspective view from the rear of the reflector of a searchlight embodying my invention showing my lamp unit in a transitory or suspended position.

After the occulter has thus been secured in position, the lamp unit 1 is inserted into the supporting casting 68 from the rear of the reflector, as shown in Fig. 2, the brushes 108 being in electrical contact with the tube 22 of the lamp unit. The lamp unit, which bears on the flanged lining 72, is rotated by the hand wheel 57 until the positive electrode is in proper position with respect to the focus of the reflector. As hereinbefore described, the lamp unit may be moved axially with respect to the casting 68 by causing the detent 74 to engage the threads of the cylindrical member 56. The lamp unit 1 may be readily removed from the casting 68 by disengaging the detent 74 in the manner previously described.

The electrical circuit is from the plug 88 connected to the positive side of the line through the bus bar 84, pins 85, base 92, and brushes 108, which make electrical contact with tube 22 of the lamp unit, from tube 22 through member 11, arms 13, the positive nozzle 12 to the positive electrode. Thence to the negative side through the negative electrode, the casting 36, and rod 42, to the negative plug 52 connected to the negative side of the line. The circuit having been established, the arc is struck by moving the handle 48 inwardly compressing the spring 49, which brings the negative electrode against the positive electrode, whereupon the handle 48 is released, permitting the spring 49 to return to normal position. The negative and positive electrode holders may be rotated by the hand wheel 26 without altering their relation to each other. However, if it is desired to rotate the positive holder without rotating the negative holder, this may be done by holding the hand wheel 31' and rotating the hand wheel 26. In order to compensate for consumption of the electrodes the negative electrode is fed forward by rotating the hand wheel 31'. Under normal operating conditions, the rotation of the eccentric negative electrode is sufficient to maintain an evenly burned positive crater, however, abnormal conditions cause the positive electrode to burn unevenly and form abnormal lips about its crater. In order to correct this uneven burning, the protruding lips are burned off by laterally displacing the negative electrode and rotating it to burn off the uneven portions. This is accomplished by moving the handle 48 laterally, thereby flexing the rod 42 and displacing the negative electrode holder from its normal position in the manner hereinbefore described. When the searchlight is in operation the shutter 96 of the occulter is in open position as shown in Fig. 8. In such open position the rays of light from the positive crater pass freely to the reflector as indicated by the broken lines 103. It will be observed that rays of light not striking the reflector are intercepted by this shutter. The rays of light intercepted within the occulter are of course reflected and these reflected rays are intercepted by the baffle 104. The arc is shielded from the elements at all times by the member 90 which embraces the focal region of the lamp. When it is desired to darken the lamp the shutter 96 is moved to closed position by the handle 100, as shown in Fig. 13. In this position, the arc may be struck and the lamp focused, the arc being viewed through the arc viewing device hereinbefore described. When the occulter is closed, the heat and gases from the arc are dissipated through the ventilator 94 at the end of the chimney member 93, which ventilator, although permitting the free passage of the products of combustion, obstructs the passage of light.

While I have described my invention as embodied in concrete form and as operating in a specific manner in accordance with the provisions of the patent statutes, it should be understood that I do not limit my invention thereto, since various modifications thereof will suggest themselves to those skilled in the art, without departing from the spirit of my invention, the scope of which is set forth in the annexed claims.

What I claim as new and desire to secure by Letters Patent of the United States, is:—

1. An open type searchlight comprising an arc lamp including the regulating mechanism therefor, a reflector having a central opening, a mounting for the reflector, and means on the mounting concentric with said opening for supporting the arc lamp with its regulating mechanism in position with the arc at the focus of the reflector.

2. An open type searchlight comprising an arc lamp including the regulating mechanism therefor having manual controlling means at one end thereof, a reflector having a central opening, a mounting for the reflector, and means on the mounting arranged concentric with said opening for supporting the arc lamp with the manual controlling means in the rear of the reflector.

3. An open type searchlight comprising an arc lamp including the regulating mechanism therefor, a reflector having a central opening, a mounting for the reflector, means on the mounting concentric with said opening for supporting the arc lamp with its regulating mechanism and manually actuated means for locating the light emitting element of the lamp in the focal region of the reflector from the rear of the reflector.

4. An open type searchlight comprising a reflector having a central opening, a tubular supporting member in said opening, an arc lamp including regulating mechanism therefor supported by said member, an occulter shielding the focal region of the reflector and a baffle on the periphery of the reflector in the path of direct rays and rays reflected by the occulter.

5. A searchlight comprising a reflector having a central opening, a tubular supporting member in said opening, an arc lamp unit arranged to be inserted through said tubular member from the rear of the reflector and supported thereby comprising operating means located in the rear of the reflector, an occulter interposed between the reflector and the light, means for operating the occulter from the rear of the reflector and means for viewing the arc from the rear of the reflector when the occulter is in an open or closed position.

6. A searchlight comprising a reflector having a central opening, a cylindrical supporting member in said opening, an arc lamp unit arranged to be inserted through said cylindrical member from the rear of the reflector and supported by said cylindrical member, means for locating the light emitting element in the focal region forming a part of the lamp unit located in the rear of the reflector, an element having a chamber embracing the focal region and thereby shielding the arc, open at its end nearest the reflector and having ventilating means at its opposite end, a shutter located between the positive crater and the reflector for intercepting the light rays from the arc and means for operating the shutter located in the rear of the reflector.

7. A searchlight comprising a reflector having an opening, supporting means in said opening, an arc lamp unit arranged to be inserted through said means from the rear of the lamp and supported thereby, operating means forming a part of the lamp unit located in the rear of the reflector, a cylindrical occulter on the lamp unit surrounding the focal region of the reflector having a shutter, means for operating the shutter from the rear of the reflector and a baffle arranged to intercept reflected light from within the occulter.

8. A searchlight comprising an arc-lamp having a positive electrode holder, means centrally located in the lamp supporting said holder, said means and holder forming the positive electrode circuit in the lamp, a reflector having an opening, means in said opening for supporting the lamp and brushes connected with the positive source located in the central opening arranged to make contact with said central supporting means.

9. A searchlight arc-lamp comprising a fixed positive electrode holder concentric with the axis of the lamp, a negative electrode holder for supporting the negative electrode eccentric to the axis of the lamp, and manually actuated means for moving the negative holder to strike the arc and for varying its position with respect to the axis of the lamp.

10. A searchlight arc-lamp comprising a fixed positive electrode holder concentric with the axis of the lamp, a negative electrode holder for supporting the negative electrode eccentric to the axis of the lamp, manually actuated means for moving the negative holder to strike the arc and for varying its position with respect to the axis of the lamp, and manually actuated means concentric with said latter means for moving the negative holder to compensate for consumption and for regulating the length of the arc.

11. In a searchlight arc-lamp, a fixed positive electrode holder concentric with the axis of the lamp, a negative electrode holder for supporting the negative electrode eccentric to the axis of the lamp, a manually actuated cylindrical member for moving the negative holder in either direction parallel to the axis of the lamp, a flexible conducting member extending through said cylindrical member slidably pivoted at two points therein, connected to the negative holder at one end and provided at its opposite end with an operating handle and resilient means normally urging said conducting member in one position.

12. A searchlight arc lamp comprising a positive electrode holder positioning the positive electrode in the axis of the lamp, a negative electrode holder positioning the negative electrode in juxtaposition to the positive electrode, a hand controlled flexible member secured to the negative holder, loosely journaled so that it may be rotated, slid and flexed by the hand operated portion of the member, whereby the arc is struck by sliding, the negative electrode is revolved about the axis of the positive electrode by rotating and the path of the negative electrode around the positive is varied by flexing the flexible member.

13. In a searchlight arc-lamp, a positive electrode holder comprising a tubular member, a nozzle, arms arranged symmetrically extending from the tubular member and supporting the nozzle directed toward the tubular member, said tubular member, supporting arms and nozzle forming a part of the electric circuit to the positive electrode, a negative electrode holder within the region inclosed by said arms, and means for controlling the negative holder and forming a part of the negative electrode circuit within said tubular member.

14. In a searchlight arc-lamp, a positive electrode holder comprising a tubular member, a nozzle, three arms arranged equidistantly from each other extending from the tubular member and supporting the nozzle directed toward the tubular member in the axis of the tubular member, said tubular member, supporting arms and nozzle forming a part of the electric circuit to the positive electrode, a negative electrode holder within the region inclosed by said arms, and means for controlling the negative holder and forming a part of the negative electrode circuit within said tubular member.

15. In a searchlight arc-lamp, a positive electrode holder comprising a tubular member, a nozzle, arms arranged symmetrically to form a balanced circuit extending from the tubular member and supporting the nozzle directed toward the tubular member, said tubular member, supporting arms and nozzle forming a part of the electric circuit to the positive electrode, a negative electrode holder within the region inclosed by said arms supporting the negative electrode eccentric to the axis of the positive electrode holder, and means for controlling the negative holder and forming a part of the negative electrode circuit within said tubular member.

16. In a searchlight arc-lamp, a positive electrode holder comprising a tubular member, a nozzle, three arms arranged equidistantly from each other extending from the tubular member and supporting said nozzle directed toward the tubular member, said tubular member, supporting arms and nozzle forming a part of the electric circuit to the positive electrode, a negative electrode holder within the region inclosed by said arms mounted eccentrically to the axis of the positive electrode holder on suitable means, and means for controlling the negative holder and forming a part of the negative electrode circuit within said tubular member.

17. A searchlight comprising an arc-lamp, a reflector and an occulter having a chamber open at one end with a ventilating passage shielded to intercept the passage of light at its other end, a base, means extending from said base supporting the chamber in a position to embrace the focal region of the reflector permitting the passage of direct rays of light to the reflector and a tubular member surrounding the supporting means arranged to move in either direction between the chamber-forming part and said base and thereby intercept or permit the passage of rays of light from the focal region to the reflector.

18. A searchlight comprising an arc-lamp, a reflector and an occulter having an open ended chamber, a base concentric with said lamp, arms extending from said base supporting the chamber in the axis of the lamp in a position to embrace the focal region of the reflector and to permit the free passage of direct rays of light to the reflector, and a tubular member surrounding the arms and chamber-forming part arranged to move in either direction parallel to the axis of the lamp.

19. A searchlight comprising an arc-lamp, a reflector and an occulter having an open ended chamber, a base, means extending from said base supporting the chamber in a position to embrace the focal region of the reflector and permitting the free passage of rays of light from said focal region to the reflector and a tubular member surrounding said supporting means arranged to intercept the passage of light rays from said focal region in one position and to permit their passage in another position.

20. A searchlight comprising an arc-lamp, a reflector and an occulter having an open ended chamber, a base, means extending from said base supporting the chamber in a position to embrace the focal region of the reflector, a movable member surrounding said supporting means arranged to intercept the passage of light rays from said focal region in one position and to permit free passage in another position, and means whereby the arc may be viewed in both of said positions from the rear of the reflector.

21. An open type searchlight having a reflector, an arc lamp, a hood for the lamp mounted in front of the reflector, an opening in the reflector and an opening in the hood, both openings located in juxtaposition whereby the arc lamp may be inserted into the hood from the rear of the reflector while the hood is in position.

22. An open type searchlight having a reflector, an arc lamp, a hood for the lamp mounted in front of the reflector, an opening in the reflector and an opening in the hood, both openings located in juxtaposition whereby the arc lamp may be inserted into the hood from the rear of the reflector while the hood is in position, and bearings whereby the electrodes of the arc lamp may be adjusted as a unit and the arc focused with respect to the reflector.

23. An open type searchlight having a reflector, an arc lamp, a hood for the lamp mounted in front of the reflector, an opening in the reflector and an opening in the hood, both openings located in juxtaposition whereby the arc lamp may be inserted into the hood from the rear of the reflector while the hood is in position, said hood having a shutter whereby the arc rays may be cut off from the reflector.

24. An open type searchlight having a reflector mounted on a frame, an arc lamp, a hood for the lamp mounted in front of the reflector, an opening in the reflector and an opening in the hood, both openings being located in juxtaposition whereby the lamp may be inserted into the hood from the rear of the reflector while the hood is in position, the sides of the opening in the reflector serving as a bearing for the lamp within which the lamp is adapted to be adjusted, and a brush connection in the arc circuit whereby the lamp may be adjusted with respect to the reflector without intercepting the arc circuit.

25. A drumless searchlight comprising in combination a reflector having a central aperture, an arc lamp unit having a plug shaped base adapted to fit in said aperture, means for securing said base in said aperture, and means actuable from a position without the beam from said reflector for adjusting the position of said unit with respect to said reflector.

26. In a drumless searchlight, a support, a reinforced projector pivotally supported thereby, said projector having a central aperture, and an arc lamp mechanism slidably mounted in said aperture whereby said lamp may be inserted into and withdrawn from said aperture.

27. A drumless searchlight comprising a rotatably mounted base and trunnion arms, a reinforced metallic frame pivoted on said arms, and forming a backing for the projector, said frame and projector having a central aperture, a lamp unit detachably secured in said aperture and projecting axially therefrom including a substantially cylindrical housing or shield spaced from said projector and adapted to enclose on three sides the arcing tips of the electrodes, the open side of said housing being toward the projector, and light proof exhaust means connecting the interior with the exterior of said housing to remove the arc fumes.

28. In a drumless searchlight, the combination with a projector having a central aperture, of a housing supported therein, a second housing spaced from said other housing and supported therefrom, and an electrode holder within said second housing.

29. In a searchlight, a projector having a central aperture, a cylindrical housing member adapted to be secured in said aperture fixed with respect to said projector and having its longitudinal axis substantially coincident with the axis of said projector, arc light mechanism carried by said member, and means for actuating said mechanism from the rear of said projector.

30. In a searchlight, a support, a reinforced projector pivotally supported thereby, said projector having a central aperture, and an arc lamp mechanism slidably mounted in said aperture, said lamp mechanism consisting of a pair of spaced housings adapted to support the two electrodes substantially in the axis of the projector, one of which fits within said aperture while the other is in offset relation thereto.

31. In a searchlight, a support, a reinforced projector pivotally supported thereby, said projector having a central aperture, and an arc lamp mechanism slidably mounted in said aperture, said lamp mechanism consisting of a pair of spaced housings adapted to support the two electrodes, one of which fits within said aperture while the other is in offset relation thereto, the latter supporting the positive electrode with its crater facing the projector.

32. A drumless searchlight comprising a rotatably mounted base and trunnion arms, a reinforced metallic frame pivoted on said arms, and forming a backing for the projector, said frame and projector having a central aperture, and a pair of spaced, connected electrode-holders, one of which is supported in said aperture, the positive electrode being adapted to be supported in the holder spaced from the projector with its arcing end facing the projector.

33. In a drumless searchlight, the combination with the reflector having a central aperture, of a positive electrode holder therefor including a support adapted to be secured in said aperture, feeding means on said holder and an insulated shield adapted to cut off all light rays from said electrode except those striking the reflector.

34. In a drumless searchlight, the combination with the reflector having a central aperture, of a positive electrode holder therefor including a support adapted to be secured in said aperture, feeding means on said holder, an insulated shield adapted to cut off all light rays from said electrode except those striking the reflector and light proof exhaust means connecting the interior with the exterior of said shield to remove the arc fumes.

35. In a searchlight, a projector, a pair of spaced hollow members having openings on their sides nearest each other, holders adapted to support a pair of electrodes between said members, a sleeve-like member telescopically engaging one of said hollow members, and means for moving said sleeve member into engagement with the other of said hollow members for enclosing the opening between said hollow members.

36. In a searchlight, a projector, a pair of spaced hollow members having openings on their sides nearest each other, holders adapted to support a pair of electrodes between said members, a sleeve-like member telescopically engaging one of said hollow members, means for moving said sleeve member into engagement with the other of said hollow members for enclosing the opening between said hollow members and means for ventilating said members.

37. In a searchlight, the combination with a projector and a pair of electrode holders, of an arc housing normally enclosing the arc on three sides and facing the projector, a ventilating means communicating with the said housing, a closure for the open side of said housing and means for opening and closing the same.

38. In an open type searchlight, the combination with a projector having a central aperture, of a lamp unit insertable in said aperture, electrode holders supported in said lamp unit and manual means accessible from the back of the projector for adjusting the relative alignment of the holders.

39. In an open type searchlight, the combination with a projector having a central aperture, of a lamp unit insertable in said aperture, electrode holders supported in said lamp unit, manual means accessible from the back of the projector for moving one of said holders axially to strike the arc, and other manual means also similarly accessible for feeding the electrodes to compensate for consumption.

In witness whereof, I have hereunto set my hand this twenty fourth day of June, 1920.

CROMWELL A. B. HALVORSON, JR.

CERTIFICATE OF CORRECTION.

Patent No. 1,718,927.                          Granted June 25, 1929, to

CROMWELL A. B. HALVORSON, JR.

It is hereby certified that error appears in the printed specification of the above numbered patent requiring correction as follows: Page 1, line 84, strike out the word "partly"; page 6, line 94, claim 4, strike out the words "An open type" and insert instead the letter "A"; and that the said Letters Patent should be read with these corrections therein that the same may conform to the record of the case in the Patent Office.

Signed and sealed this 13th day of August, A. D. 1929.

(Seal)

M. J. Moore,
Acting Commissioner of Patents.